US012783234B2

(12) United States Patent
Gupta et al.

(10) Patent No.: US 12,783,234 B2
(45) Date of Patent: Nov. 3, 2026

(54) METHODS AND APPARATUS TO ALLOCATE ACCELERATOR USAGE

(71) Applicant: Intel Corporation, Santa Clara, CA (US)

(72) Inventors: Monica Gupta, Hillsboro, OR (US); Mousumi Hazra, Vancouver, WA (US); Javier Martinez, El Dorado Hills, CA (US); Stephen H. Gunther, Beaverton, OR (US); Manuj Sabharwal, Folsom, CA (US); Michael Voss, Austin, TX (US); Derrick Jones, Portland, OR (US); Saurabh Tangri, Folsom, CA (US); Duncan Glendinning, Chandler, AZ (US); Dorit Shapira, Portland, OR (US)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/148,698

(22) Filed: Dec. 30, 2022

(65) Prior Publication Data

US 2023/0136365 A1 May 4, 2023

(51) Int. Cl.
*G06F 9/30* (2018.01)
*G06F 9/50* (2006.01)

(52) U.S. Cl.
CPC .......... *G06F 9/30032* (2013.01); *G06F 9/505* (2013.01)

(58) Field of Classification Search
CPC ............................ G06F 9/30032; G06F 9/505
See application file for complete search history.

(56) References Cited

U.S. PATENT DOCUMENTS

| | | | | |
|---|---|---|---|---|
| 9,984,044 | B2 * | 5/2018 | Dunne | H04L 41/147 |
| 10,545,793 | B2 | 1/2020 | Ananthakrishnan et al. | |
| 11,436,118 | B2 | 9/2022 | Weissmann et al. | |
| 2010/0268912 | A1 * | 10/2010 | Conte | G06F 11/3409 712/20 |
| 2015/0365343 | A1 * | 12/2015 | Imade | H04L 43/0805 709/226 |
| 2022/0075655 | A1 * | 3/2022 | Thyagaturu | G06F 9/5088 |

* cited by examiner

*Primary Examiner* — Zachary K Huson
(74) *Attorney, Agent, or Firm* — Hanley, Flight & Zimmerman, LLC

(57) ABSTRACT

Methods, apparatus, systems, and articles of manufacture are disclosed to allocate accelerator usage. An apparatus to allocate accelerator usage comprises: at least one memory, machine readable instructions, and processor circuitry to at least one of instantiate or execute the machine readable instructions to: store data identifying at least one processing unit in communication with a processing circuitry and at least one class; predict an execution of the at least one processing unit workload based on at least one capability; and schedule which processing unit the workload to run on based on at least one of (i) processor circuitry or (ii) user priority parameters.

22 Claims, 12 Drawing Sheets

1100

1104

1106

1102

| | | | | | | | | |
|---|---|---|---|---|---|---|---|---|
| | TIMESTAMP | | | | | | | |
| | CLASS 3 | | CLASS 2 | | CLASS 1 | | CLASS 0 | |
| | EE CHANGED | PERF CHANGED | EE CHANGED | PERF CHANGED | EE CHANGED | PERF CHANGED | EE CHANGED | PERF CHANGED |
| IGPU | EE CAP | PERF CAP | EE CAP | PERF CAP | EE CAP | PERF CAP | EE CAP | PERF CAP |
| DGPU | EE CAP | PERF CAP | EE CAP | PERF CAP | EE CAP | PERF CAP | EE CAP | PERF CAP |
| VPU | EE CAP | PERF CAP | EE CAP | PERF CAP | EE CAP | PERF CAP | EE CAP | PERF CAP |
| CPU 0 (LEGACY) | EE CAP | PERF CAP | EE CAP | PERF CAP | EE CAP | PERF CAP | EE CAP | PERF CAP |
| ... | | | | | | | | |
| CPU N (LEGACY) | EE CAP | PERF CAP | EE CAP | PERF CAP | EE CAP | PERF CAP | EE CAP | PERF CAP |

FIG. 11

1200

| HARDWARE FEEDBACK MEMORY TABLE | | | | | | | | | | | | |
|---|---|---|---|---|---|---|---|---|---|---|---|---|
| xPUs | TIMESTAMP | | | | | | | | | | | |
| | CLASS 5 | | CLASS 4 | | CLASS 3 | | CLASS 2 | | CLASS 1 | | CLASS 0 | |
| | EE CHANGED | PERF CHANGED | EE CHANGED | PERF CHANGED | EE CHANGED | PERF CHANGED | EE CHANGED | PERF CHANGED | EE CHANGED | PERF CHANGED | EE CHANGED | PERF CHANGED |
| IGPU | EE CAP | PERF CAP | EE CAP | PERF CAP | EE CAP | PERF CAP | EE CAP | PERF CAP | EE CAP | PERF CAP | EE CAP | PERF CAP |
| DGPU | EE CAP | PERF CAP | EE CAP | PERF CAP | EE CAP | PERF CAP | EE CAP | PERF CAP | EE CAP | PERF CAP | EE CAP | PERF CAP |
| VPU | EE CAP | PERF CAP | EE CAP | PERF CAP | EE CAP | PERF CAP | EE CAP | PERF CAP | EE CAP | PERF CAP | EE CAP | PERF CAP |
| CPU 0 | EE CAP | PERF CAP | EE CAP | PERF CAP | EE CAP | PERF CAP | EE CAP | PERF CAP | EE CAP | PERF CAP | EE CAP | PERF CAP |
| ... | | | | | | | | | | | | |
| CPU N | EE CAP | PERF CAP | EE CAP | PERF CAP | EE CAP | PERF CAP | EE CAP | PERF CAP | EE CAP | PERF CAP | EE CAP | PERF CAP |

1206 1204 1202 1100

FIG. 12

METHODS AND APPARATUS TO ALLOCATE ACCELERATOR USAGE

FIELD OF THE DISCLOSURE

This disclosure relates generally to computing devices and, more particularly, to methods and apparatus to allocate accelerator usage.

BACKGROUND

In recent years, computing devices have been implemented with any type of processing units, or different types of accelerators. For example, a computing device can be implemented with one or more high performance accelerators (e.g., also referred to as performance cores or big cores) and one or more efficient accelerators (e.g., also referred to as little cores or atoms). Performance accelerators are faster and/or capable of executing complex tasks, but require a large amount of resources (e.g., space, processor resources, memory, etc.) to implement. Efficient accelerators are slower, but utilize a small amount of resources. Additionally, new accelerators are continuously being introduced to computing devices which creates a need to leverage the usage of these existing and new accelerators for quality of service (e.g., performance, efficiency, etc.).

BRIEF DESCRIPTION OF THE DRAWINGS

FIG. 11 is an example of a conventional memory table.

FIG. 12 is an example of a hardware feedback memory table.

In general, the same reference numbers will be used throughout the drawing(s) and accompanying written description to refer to the same or like parts. The figures are not to scale.

Figure 1:
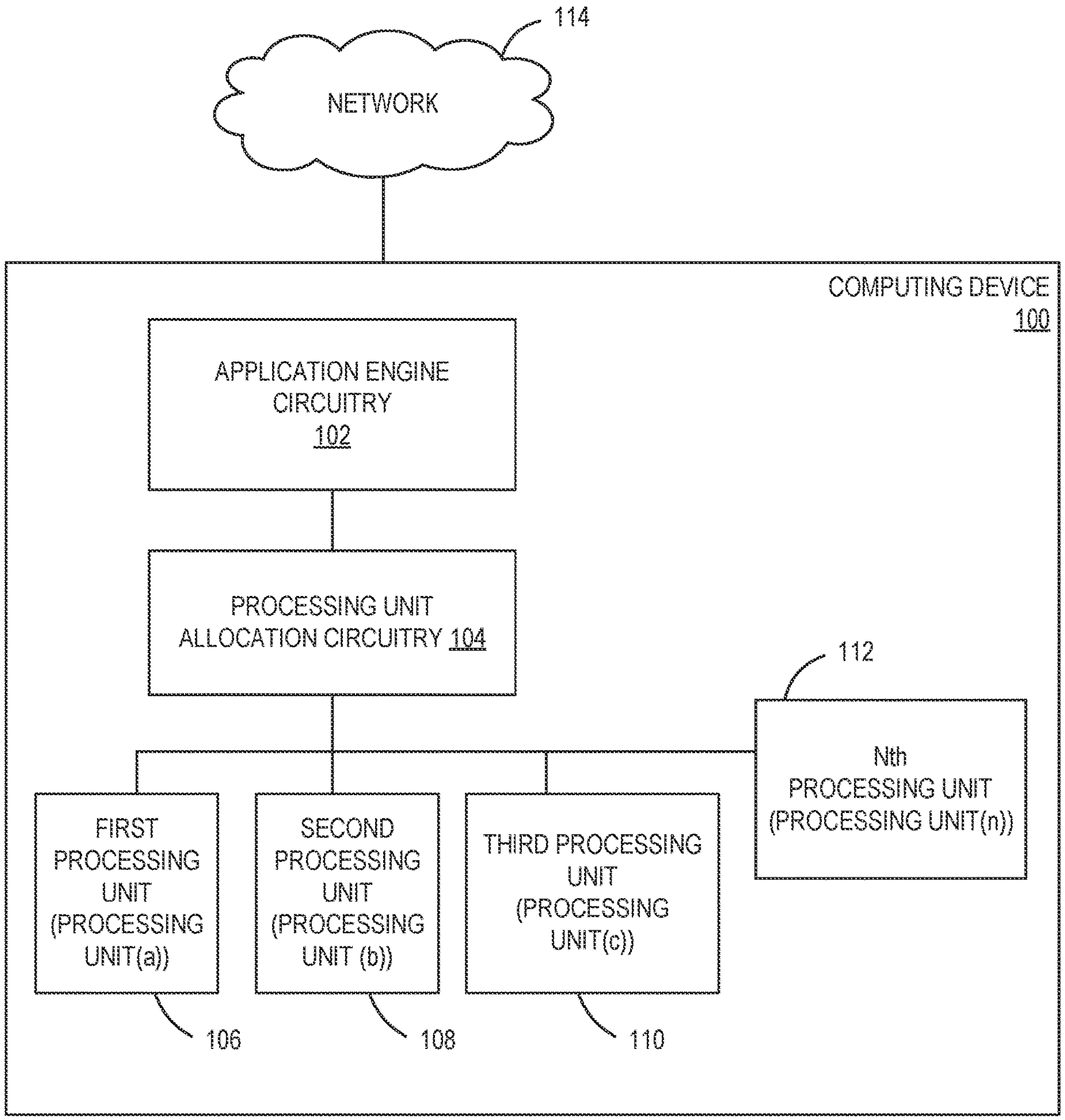
FIG. 1 is a block diagram of an example computing device for executing one or more applications described in conjunction with examples disclosed herein.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

In computing devices, new types of accelerators (processing units) are being introduced. In some examples, a computing device may include processing units such as integrated GPUs, discrete GPUs, VPUs, and CPUs. In some examples, processing units can be dynamically added to the computing device (e.g., via a USB port). Traditionally, the processing unit(s) an application (e.g., a program, an artificial intelligence model, machine learning model, a thread, etc.) will run on is dependent on a selection made by the developer of the application. However, application developers typically do not consider the processing capabilities over different processing units, the availability of processing units, and/or the other application(s) running on the same computing device, contending for the same processing unit(s). Additionally, as new processing unit(s) are introduced, the ability to consider capabilities (e.g., the performance, efficiency, etc.) of multiple processing units is a valuable asset. The current state-of-the-art only considers cores and atoms when deciding where to run the application. Examples disclosed herein include hardware feedback to consider multiple processing units and a scheduler to schedule application workloads to the appropriate accelerator(s).

FIG. 1 is a block diagram of an example computing device 100 for implementing applications locally and/or using cloud-based resources. In the illustrated example of FIG. 1, the computing device 100 includes application engine circuitry 102, processing unit allocation circuitry 104, a first processing unit (processing unit(a)) 106, a second processing unit (processing unit(b)) 108, a third processing unit (processing unit(c)) 110, and an nth processing unit (processing unit(n)) 112. FIG. 1 further includes an example network 114, via which the computing device 100 may communicate.

The example computing device 100 of FIG. 1 is a device capable of executing parallel instructions obtained via the example network 114 (e.g., from a cloud-based service/server, another computing device, etc.). The example computing device 100 may be a server, a processing device, a mobile device (e.g., a tablet, a smartphone, etc.), a personal computer, an edge device, a fog device, a client device, a smart device (e.g., smart phone, smart appliance, etc.), and/or any other computing device capable of executing instructions. The example computing device 100 includes the example processing unit allocation circuitry 104 to consider multiple processing unit capabilities based on quality of service and schedule workloads to an appropriate processing unit (e.g., the first processing unit 106, the second processing unit 108, the third processing unit 110, the nth processing unit 112, etc.). In some instances, the first processing unit 106, the second processing unit 108, the third processing unit 110, and/or the nth processing unit 112 can each be implemented using one or more of a GPU, a CPU, or a VPU.

The example computing device 100 further includes the application engine circuitry 102 to identify and/or determine processing unit(s) available when the computing device 100 boots or when a compatible device is dynamically attached to the computing device 100. Further in operation, the example processing unit allocation circuitry 104 the determines priority parameters (e.g., application size, number of inferences, user interaction with the application, quality of service need, direct indication of the application, etc.) and predicts, based on priority parameters, which processing unit to schedule the application workload. In some examples, when determining which processing unit to allocate the application workload, the processing unit allocation circuitry 104 will also identify other workloads that may be running on the computing device 100, contending for the same processing unit(s). Additionally, in some instances the processing unit allocation circuitry 104 will determine the processing unit availability on the example computing device 100. Based on priority parameters, the other workload(s) running on the computing device 100, and the processing unit availability the example processing unit allocation circuitry 104 will schedule the application workload to the appropriate processing unit(s).

The processing unit allocation circuitry 104 invokes the application engine circuitry 102 which identifies and/or determines processing unit(s) when the computing device boots or when a compatible device is dynamically attached. In some examples, the accelerator may be attached through a USB port. The application engine circuitry 102 is instantiated by processor circuitry executing application engine instructions and/or configured to perform operations such as those represented by the flowcharts of FIG. 3, discussed in further detail below, but may be implemented in any other fashion.

In some examples, the application engine circuitry 102 includes means for identifying and/or determining processing units when the computing device boots or when a compatible device is dynamically attached. For example, the means for identifying and/or determining may be implemented by application engine circuitry 102. In some examples, the application engine circuitry 102 may be instantiated by processor circuitry such as the example processor circuitry 512 of FIG. 5. For instance, the application engine circuitry 102 may be instantiated by the example microprocessor 600 of FIG. 6 executing machine executable instructions such as those implemented by at least blocks 304 of FIG. 3. In some examples, the application engine circuitry 102 may be instantiated by hardware logic circuitry, which may be implemented by an ASIC, processing unit, or the FPGA circuitry 700 of FIG. 7 structured to perform operations corresponding to the machine readable instructions. Additionally or alternatively, the application engine circuitry 102 may be instantiated by any other combination of hardware, software, and/or firmware. For example, the application engine circuitry 102 may be implemented by at least one or more hardware circuits (e.g., processor circuitry, discrete and/or integrated analog and/or digital circuitry, an FPGA, an ASIC, an processing unit, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 2:
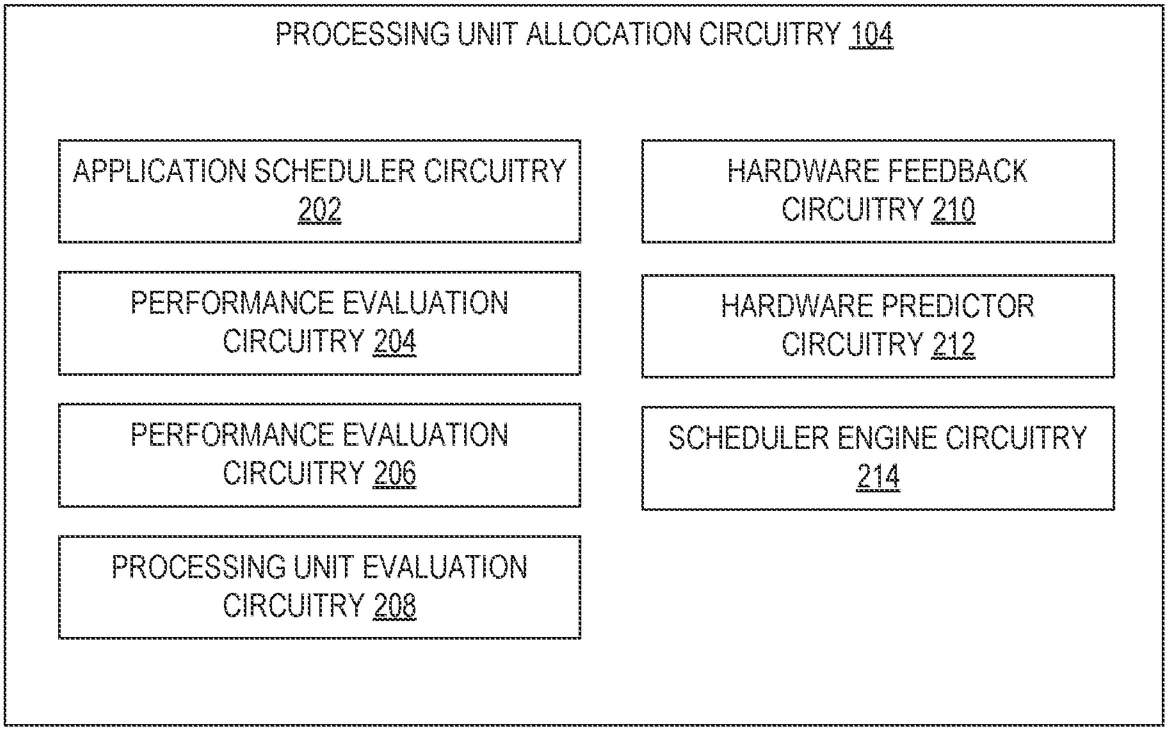
FIG. 2 is a block diagram of an example processing unit allocation circuitry of FIG. 1.

FIG. 2 is a block diagram of an example processing unit allocation circuitry 104 of FIG. 1. In the illustrated example of FIG. 2, the processing unit allocation circuitry 104 includes application scheduler circuitry 202, performance evaluation circuitry 204, efficiency evaluation circuitry 206, processing unit evaluation circuitry 208, hardware feedback circuitry 210, hardware predictor circuitry 212, and scheduler engine circuitry 214.

The processing unit allocation circuitry 104 of FIG. 2 may be instantiated (e.g., creating an instance of, bring into being for any length of time, materialize, implement, etc.) by processor circuitry such as a central processing unit executing instructions. Additionally or alternatively, the processing unit allocation circuitry 104 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The example application scheduler circuitry 202 of the illustrated example of FIG. 2 creates a hardware feedback memory table of all available processing units' capabilities on the example computing device 100. In some examples, the hardware feedback memory table enables retention of data. In some examples, the application scheduler circuitry 202 will remove processing unit(s) that are no longer available on the example computing device 100. In some examples, the hardware feedback memory table includes processing unit(s) and classes as described in detail below at FIG. 12. The application scheduler circuitry 202 is instantiated by processor circuitry executing application scheduler instructions and/or configured to perform operations such as those represented by the flowchart of FIG. 3.

In some examples, the processing unit allocation circuitry 104 includes means for creating a hardware feedback memory table. For example, the means for creating may be implemented by application scheduler circuitry 202. In some examples, the application scheduler circuitry 202 be instantiated by processor circuitry such as the example processor circuitry 512 of FIG. 5. For instance, the application scheduler circuitry 202 may be instantiated by the example microprocessor 600 of FIG. 6 executing machine executable instructions such as those implemented by at least blocks 303 of FIG. 3. In some examples, the application scheduler circuitry 202 may be instantiated by hardware logic circuitry, which may be implemented by an ASIC, XPU, or the FPGA circuitry 700 of FIG. 7 structured to perform operations corresponding to the machine readable instructions. Additionally or alternatively, the application scheduler circuitry 202 may be instantiated by any other combination of hardware, software, and/or firmware. For example, the application scheduler circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example performance evaluation circuitry 204 of the illustrated example of FIG. 2 evaluates, computes, and/or predetermines performance capabilities of different accelerators. In some examples, the performance/efficiency capabilities include core count, max frequency of the accelerator, multi-threading capabilities of the accelerator, application size, and/or time taken for one inference of the application. The performance evaluation circuitry 204 is instantiated by processor circuitry executing performance evaluation instructions and/or configured to perform operations such as those represented by the flowcharts of FIG. 3, discussed in further detail below, but may be implemented in any other fashion.

In some examples, the processing unit allocation circuitry 104 includes means for evaluating processing unit(s) performance capabilities. For example, the means for determining may be implemented by performance evaluation circuitry 204. In some examples, the performance evaluation circuitry 204 may be instantiated by processor circuitry such as the example processor circuitry 512 of FIG. 5. For instance, the performance evaluation circuitry 204 may be instantiated by the example microprocessor 600 of FIG. 6 executing machine executable instructions such as those implemented by at least blocks 304 of FIG. 3. In some examples, the performance evaluation circuitry 204 may be instantiated by hardware logic circuitry, which may be implemented by an ASIC, XPU, or the FPGA circuitry 700 of FIG. 7 structured to perform operations corresponding to the machine readable instructions. Additionally or alternatively, the performance evaluation circuitry 204 may be instantiated by any other combination of hardware, software, and/or firmware. For example, the performance evaluation circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example efficiency evaluation circuitry 206 of the illustrated example of FIG. 2 computes and/or evaluates the efficiency capabilities of the processing unit(s), described in further detail below. The efficiency evaluation circuitry 206 is instantiated by processor circuitry executing efficiency evaluation instructions and/or configured to perform operations such as those represented by the flowchart of FIG. 3. In some examples, the efficiency capabilities are calculated by power consumed and/or time to execute workload of a given application. In some examples, the processing unit allocation circuitry can include other parameters by which a processing unit may be evaluated, such as, power evaluation, latency evaluation, execution time, etc.

In some examples, the processing unit allocation circuitry 104 includes means for evaluating processing unit efficiency capabilities. For example, the means for determining may be implemented by efficiency evaluation circuitry 206. In some examples, the efficiency evaluation circuitry 206 may be instantiated by processor circuitry such as the example processor circuitry 512 of FIG. 5. For instance, the efficiency evaluation circuitry 206 may be instantiated by the example microprocessor 600 of FIG. 6 executing machine executable instructions such as those implemented by at least block 305 of FIG. 3. In some examples, the efficiency evaluation circuitry 206 may be instantiated by hardware logic circuitry, which may be implemented by an ASIC, XPU, or the FPGA circuitry 700 of FIG. 7 structured to perform operations corresponding to the machine readable instructions. Additionally or alternatively, the efficiency evaluation circuitry 206 may be instantiated by any other combination of hardware, software, and/or firmware. For example, the efficiency evaluation circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example processing unit evaluation circuitry 208 of the illustrated example of FIG. 2 determines the highest performing and/or efficient processing unit on the example computing device 100 and controls one of the processing unit's classes to fill and/or populate the hardware memory feedback table with the capabilities across other processing units relative to the highest processing unit performance. The processing unit evaluation circuitry 208 is instantiated by processor circuitry executing processing unit evaluation instructions and/or configured to perform operations such as those represented by the flowchart of FIG. 3.

In some examples, the processing unit allocation circuitry 104 includes means for determines the highest performing and/or efficient processing unit and filling and/or populating hardware feedback memory table. For example, the means for determining may be implemented by processing unit evaluation circuitry 208. In some examples, the processing unit evaluation circuitry 208 be instantiated by processor circuitry such as the example processor circuitry 512 of FIG. 5. For instance, the processing unit evaluation circuitry 208 may be instantiated by the example microprocessor 600 of FIG. 6 executing machine executable instructions such as those implemented by at least blocks 306, 308 of FIG. 3. In some examples, the processing unit evaluation circuitry 208 may be instantiated by hardware logic circuitry, which may be implemented by an ASIC, XPU, or the FPGA circuitry 700 of FIG. 7 structured to perform operations corresponding to the machine readable instructions. Additionally or alternatively, the processing unit evaluation circuitry 208 may be instantiated by any other combination of hardware, software, and/or firmware. For example, the processing unit evaluation circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example hardware feedback circuitry 210 of the illustrated example of FIG. 2 identifies combinations of parameters that result in the highest performing processing unit(s) to be at least one of the other processing unit(s) on the example computing device 100. In some examples, the highest performing processing unit(s) is the accelerator that can perform the workload in the shortest duration of time. In some instances, the highest performing processing unit(s) is the accelerator that can perform instructions or instruction mix in the shortest duration of time. In some examples, the combination of parameters includes values for model size, inference time and bind time, that results in highest performing processing unit to be a different processing unit on the example computing device 100. For example, the highest performing processing unit may be a CPU and/or an integrated GPU if the previous highest performing processing unit was a VPU. The hardware feedback circuitry 210 is instantiated by processor circuitry executing hardware feedback instructions and/or configured to perform operations such as those represented by the flowcharts of FIG. 3, discussed in further detail below.

In some examples, the processing unit allocation circuitry 104 includes means for identifying a combination of parameters. For example, the means for identifying may be implemented by hardware feedback circuitry 210. In some examples, the hardware feedback circuitry 210 be instantiated by processor circuitry such as the example processor circuitry 512 of FIG. 5. For instance, the hardware feedback circuitry 210 may be instantiated by the example microprocessor 600 of FIG. 6 executing machine executable instructions such as those implemented by at least blocks 310, 312, 314, 316, 402 of FIGS. 3 and 4. In some examples, hardware feedback circuitry 210 may be instantiated by hardware logic circuitry, which may be implemented by an ASIC, XPU, or the FPGA circuitry 700 of FIG. 7 structured to perform operations corresponding to the machine readable instructions. Additionally or alternatively, the hardware feedback circuitry 210 may be instantiated by any other combination of hardware, software, and/or firmware. For example, the hardware feedback circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example hardware predictor circuitry 212 of the illustrated example of FIG. 2 predicts the class, the application the running on a processing unit, shall belong to next based on parameters, further detail provided below. The hardware predictor circuitry 212 is instantiated by processor circuitry executing hardware predictor instructions and/or configured to perform operations such as those represented by the flowchart of FIG. 4.

In some examples, the processing unit allocation circuitry 104 includes means for predicting the class, the application the running on a processing unit, shall belong to next based on parameters. For example, the means for predicting may be implemented by hardware predictor circuitry 212. In some examples, the hardware predictor circuitry 212 be instantiated by processor circuitry such as the example processor circuitry 512 of FIG. 5. For instance, the hardware predictor circuitry 212 may be instantiated by the example microprocessor 600 of FIG. 6 executing machine executable instructions such as those implemented by at least blocks 404 of FIG. 4. In some examples, the hardware predictor circuitry 212 may be instantiated by hardware logic circuitry, which may be implemented by an ASIC, XPU, or the FPGA circuitry 700 of FIG. 7 structured to perform operations corresponding to the machine readable instructions. Additionally or alternatively, the hardware predictor circuitry 212 may be instantiated by any other combination of hardware, software, and/or firmware. For example, the hardware predictor circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example scheduler engine circuitry 214 of the illustrated example of FIG. 2 decides what capability (e.g., performance, efficiency, quality of service, latency, power consumption, execution time, etc.) to schedule the application for, and schedules the application workload. The scheduler engine circuitry 214 is instantiated by processor circuitry executing scheduler engine instructions and/or configured to perform operations such as those represented by the flowchart of FIG. 4, discussed in further detail below.

In some examples, the processing unit allocation circuitry 104 includes means for deciding which capability to schedule the application according to. For example, the means for deciding may be implemented by scheduler engine circuitry 214. In some examples, the processing unit allocation circuitry 104 includes means for scheduling the application workload. For example, the means for scheduling may also be implemented by scheduler engine circuitry 214. In some examples, the scheduler engine circuitry 214 be instantiated by processor circuitry such as the example processor circuitry 512 of FIG. 5. For instance, the scheduler engine circuitry 214 may be instantiated by the example microprocessor 600 of FIG. 6 executing machine executable instructions such as those implemented by at least blocks 406, 408 of FIG. 4. In some examples, the scheduler engine circuitry 214 may be instantiated by hardware logic circuitry, which may be implemented by an ASIC, XPU, or the FPGA circuitry 700 of FIG. 7 structured to perform operations corresponding to the machine readable instructions. Additionally or alternatively, the scheduler engine circuitry 214 may be instantiated by any other combination of hardware, software, and/or firmware. For example, the scheduler engine circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the computing device 100 of FIG. 1 is illustrated in FIG. 2, one or more of the elements, processes, and/or devices illustrated in FIG. 2 may be combined, divided, re-arranged, omitted, eliminated, and/or implemented in any other way. Further, the example includes the example application scheduler circuitry 202, the example performance evaluation circuitry 204, the example efficiency evaluation circuitry 206, the example processing unit evaluation circuitry 208, the example hardware feedback circuitry 210, the example hardware predictor circuitry 212, the example scheduler engine circuitry 214, and/or, more generally, the example processing unit allocation circuitry 104 of FIG. 1, may be implemented by hardware alone or by hardware in combination with software and/or firmware. Thus, for example, any of the example the example application scheduler circuitry 202, the example performance evaluation circuitry 204, the example efficiency evaluation circuitry 206, the example processing unit evaluation circuitry 208, the example hardware feedback circuitry 210, the example hardware predictor circuitry 212, the example scheduler engine circuitry 214, and/or, more generally, the example processing unit allocation circuitry 104 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, processing unit allocation circuitry 104 may include one or more elements, processes, and/or devices in addition to, or instead of, those illustrated in FIGS. 1 and/or 2, and/or may include more than one of any or all of the illustrated elements, processes and devices.

Figure 3:
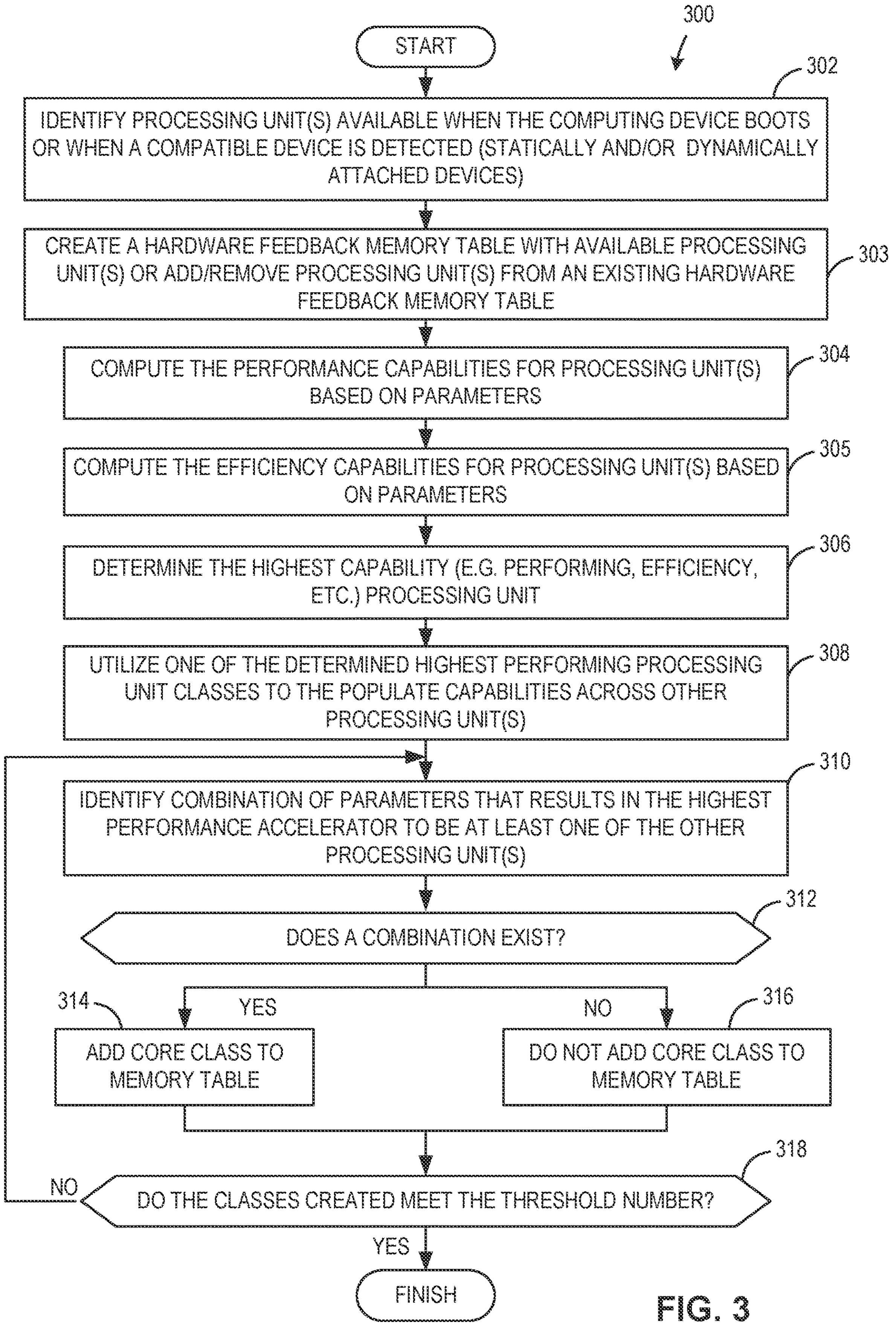
FIG. 3 is a flowchart representative of example machine readable instructions and/or example operations that may be executed by example processor circuitry to implement the processing unit allocation circuitry of FIG. 2.

Flowcharts representative of example machine readable instructions, which may be executed to configure processor circuitry to implement the computing device 100 of FIGS. 1 and/or 2, are shown in FIGS. 3 and/or 4. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3 and 4, many other methods of implementing the example computing device may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3 and 4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry to implement the processing unit allocation circuitry 104 of FIG. 2. The machine readable instructions and/or the operations 300 of FIG. 3 begin at block 302, at which the example application engine circuitry 102 identifies processing units available when the computing device 100 boots or when a compatible device is dynamically attached to the computing device 100 (block 302). The application scheduler circuitry 202 creates a hardware feedback memory table or adds and/or removes processing unit(s) from an existing hardware feedback memory table (block 303). In some examples, the hardware feedback memory table includes classes to store the efficiency and/or performance capabilities of each of the example computing device's 100 available processing unit(s).

The performance evaluation circuitry 204 computes the performance capabilities for the processing units based on parameters (block 304). In some examples, the parameters represent core count, maximum frequency of the processing unit, multi-threading capability of the processing unit, and/or the time taken for one inference for the application. Then, the efficiency evaluation circuitry 206 computes the efficiency capabilities based on the parameters (block 305). In some examples, the efficiency capabilities are calculated by power consumed and/or time to execute workload of a given application.

Once the performance and/or the efficiency capabilities are computed, the processing unit evaluation circuitry 208 determines the highest capability (e.g., performing, efficient, etc.) processing unit, comparatively, on the example computing device 100 (block 306). Various weighting parameters may be used in combination with values representing capabilities of the processing units to determine which processing unit is the highest capability processing unit. In some scenarios, different processing units may be considered to be the highest capability processing unit as a result of, for example, different weighting parameters. In other words, different parameters may be weighted differently in different scenarios and thereby cause capabilities of processing units to be measured differently. The processing unit evaluation circuitry 208 leverages one of the classes of the highest performing processing unit to populate the capabilities across other processing units relative to the highest processing unit performance (block 308). For example, if the processing unit with the highest performance capability is a CPU, then the processing unit evaluation circuitry 208 leverages one of the existing CPU classes to populate capabilities across other accelerators relative to CPU performance.

The hardware feedback circuitry 210 identifies combinations of parameters that results in the highest performing processing unit to be at least one of the other processing units on the example computing device 100 (block 310). In some examples, the combination of parameters includes values for model size, inference time and bind time, that results in highest performing processing unit a different processing unit on the example computing device 100. For instance, the highest performing processing unit may be a GPU and/or a VPU if the previous highest performing processing unit was a CPU. At block 312, the hardware feedback circuitry 210 determines if a combination exists. If such a combination exists, then the example hardware feedback circuitry 210 adds a processing unit class to the hardware feedback memory table (block 314). If a combination does not exist, the example hardware feedback circuitry 210 does not add the class to the hardware feedback memory table (block 316).

The example hardware feedback circuitry 210 repeats the process of identifying of processing unit classes until a threshold number of classes is met (block 318). If the threshold number of classes is not met the instructions loop to block 310 until the threshold is met (block 318). In some examples, the operations 300 will end when a threshold amount of memory is met. When complete, the example the hardware feedback memory table will have a number of classes to cover combinations of all relative performance and efficiency capabilities taking parameters, such as those mentioned above, into account.

The example flowchart in FIG. 3 can be run on a periodic basis. For example, the example machine readable instructions and/or example operations 300 that may be executed and/or instantiated on a user time schedule. In some examples, the operations 300 may be executed when the computing device 100 has reached a threshold amount of available memory. In other examples, the operations 300 run every time the example computing device 100 is booted.

Figure 4:
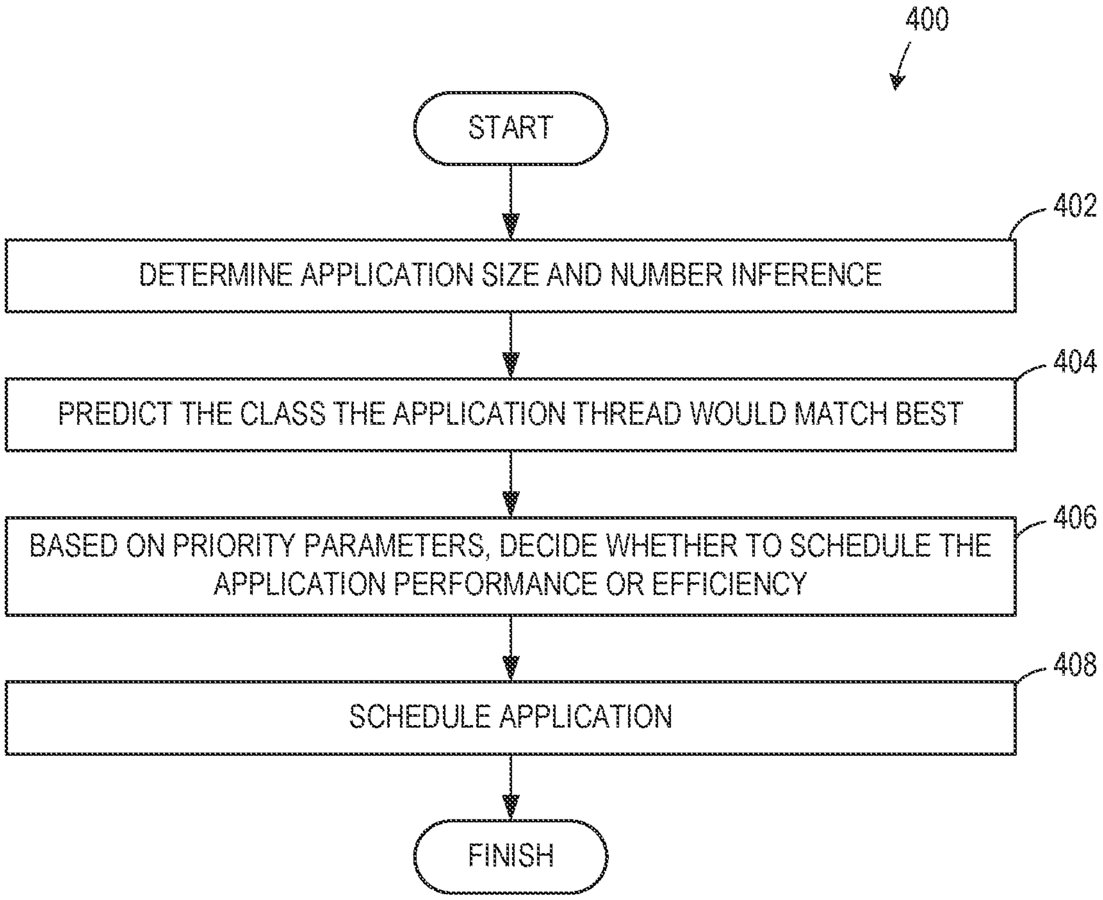
FIG. 4 is a flowchart representative of example machine readable instructions and/or example operations that may be executed by example processor circuitry to implement the processing unit allocation circuitry of FIG. 2.

FIG. 4 is a flowchart representative of example machine readable instructions and/or example operations 400 that may be executed and/or instantiated by processor circuitry to implement the processing unit allocation circuitry 104 of FIG. 2 to schedule an application on the example computing device 100. The machine readable instructions and/or the operations 400 of FIG. 4 begin at block 402, at the hardware feedback circuitry 210 determines the application size and/or number of inferences. In some examples, the application size and number of inferences is not provided and hardware feedback circuitry 210 will determine a default based on an average class. For example, determining the default class in some scenarios is determining the usage of the system, such as, the most common class an application will run on the first iteration. Alternatively, the hardware feedback circuitry 210, in some examples, will determine the class at execution of the application by a compiler with embedded metadata in the workload (e.g., execution mode latency, execution mode throughput, completion time, execution time, and/or power profiles).

At block 404, the hardware predictor circuitry 212 predicts the next class the application the running on a processing unit would belong to. The scheduler engine circuitry 214 then decides whether to schedule the application based on capabilities (e.g., efficiency, performance, power, latency, throughput, execution time, etc.) based on priority parameters (e.g., user interaction with the application, quality of service need, direct indication of the application, etc.) (block 406). The scheduler engine circuitry 214 then schedules the workload of the application (block 408).

Presenting extended hardware hints simplifies application development for application developers. The application developer will be able to submit workloads to the example processing unit allocation circuitry 104 using an interface (e.g., dev, processing unit vdevice on a platform, etc.) and the example processing unit allocation circuitry 104 can be located via system software. These hardware hints reduce manual work by application developers, reduces errors, frees time for engineers to work on more important tasks, and saves energy by locating efficient processing unit(s) on which to run a workload during a particular run time.

Figure 5:
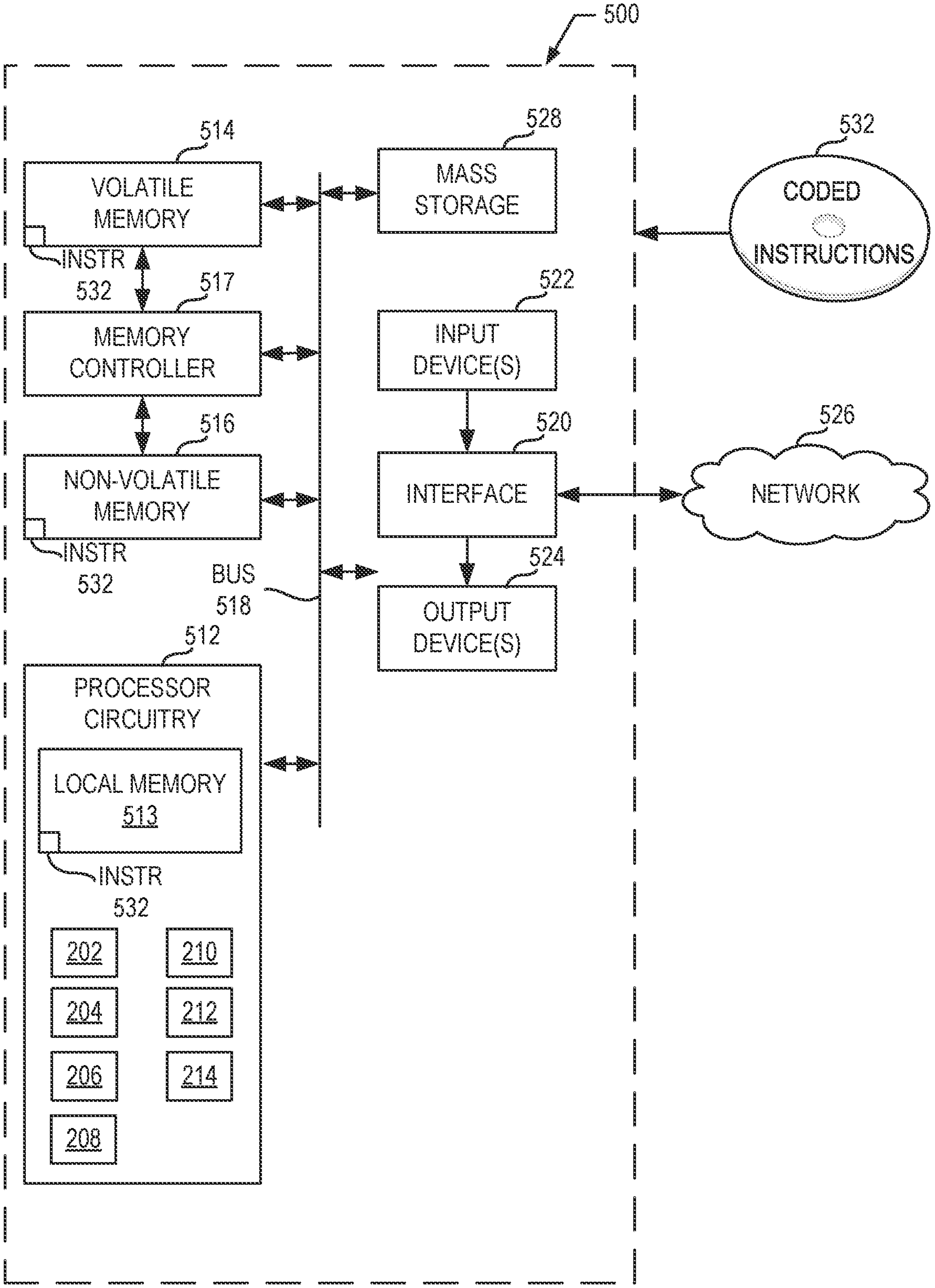
FIG. 5 is a block diagram of an example processing platform including processor circuitry structured to execute the example machine readable instructions and/or the example operations of FIG. 3 to implement the processing unit allocation circuitry of FIG. 2.

FIG. 5 is a block diagram of an example processor platform 500 structured to execute and/or instantiate the machine readable instructions and/or the operations of FIGS. 3 and 4 to implement the computing device 100 of FIGS. 1-2. The processor platform 500 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a gaming console, a headset (e.g., an augmented reality (AR) headset, a virtual reality (VR) headset, etc.) or other wearable device, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs, microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 412 implements the application scheduler circuitry 202, the performance evaluation circuitry 204, the efficiency evaluation circuitry 206, the processing unit evaluation circuitry 208, the hardware feedback circuitry 210, the hardware predictor circuitry 212, the scheduler engine circuitry 214.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 532, which may be implemented by the machine readable instructions of FIGS. 3 and 4, may be stored in the mass storage device 528, in the volatile memory 514, in the non-volatile memory 516, and/or on a removable non-transitory computer readable storage medium such as a CD or DVD.

Figure 6:
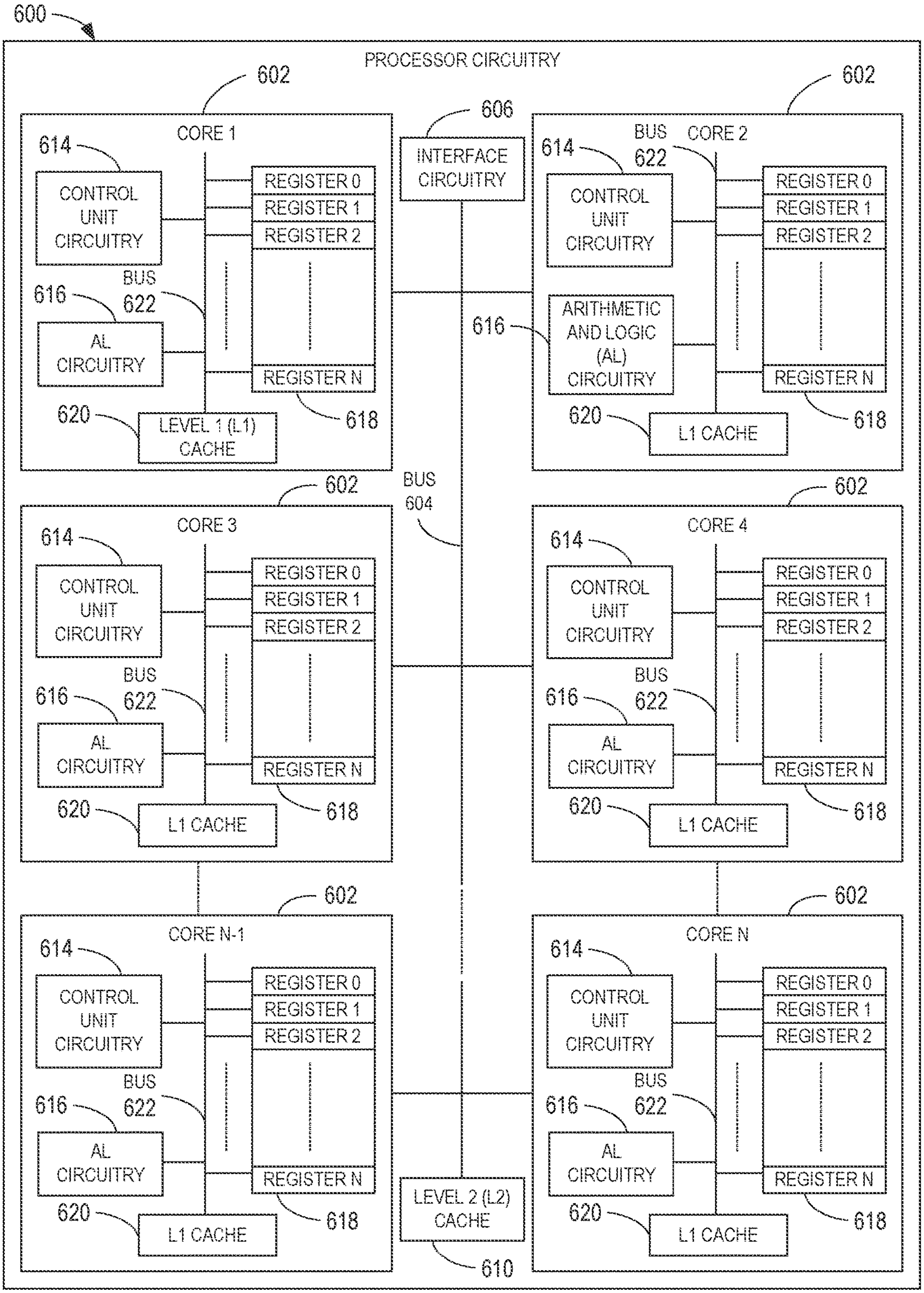
FIG. 6 is a block diagram of an example implementation of the processor circuitry of FIG. 5.

FIG. 6 is a block diagram of an example implementation of the processor circuitry 512 of FIG. 5. In this example, the processor circuitry 512 of FIG. 5 is implemented by a microprocessor 600. For example, the microprocessor 600 may be a general purpose microprocessor (e.g., general purpose microprocessor circuitry). The microprocessor 600 executes some or all of the machine readable instructions of the flowcharts of FIGS. 3 and 4 to effectively instantiate the circuitry of FIGS. 1 and 2 as logic circuits to perform the operations corresponding to those machine readable instructions. In some such examples, the circuitry of FIGS. 1 and 2 is instantiated by the hardware circuits of the microprocessor 600 in combination with the instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowchart of FIGS. 3 and 4.

The cores 602 may communicate by a first example bus 604. In some examples, the first bus 604 may be implemented by a communication bus to effectuate communication associated with one(s) of the cores 602. For example, the first bus 604 may be implemented by at least one of an Inter-Integrated Circuit (I2C) bus, a Serial Peripheral Interface (SPI) bus, a PCI bus, or a PCIe bus. Additionally or alternatively, the first bus 604 may be implemented by any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The second bus 622 may be implemented by at least one of an I2C bus, a SPI bus, a PCI bus, or a PCIe bus Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
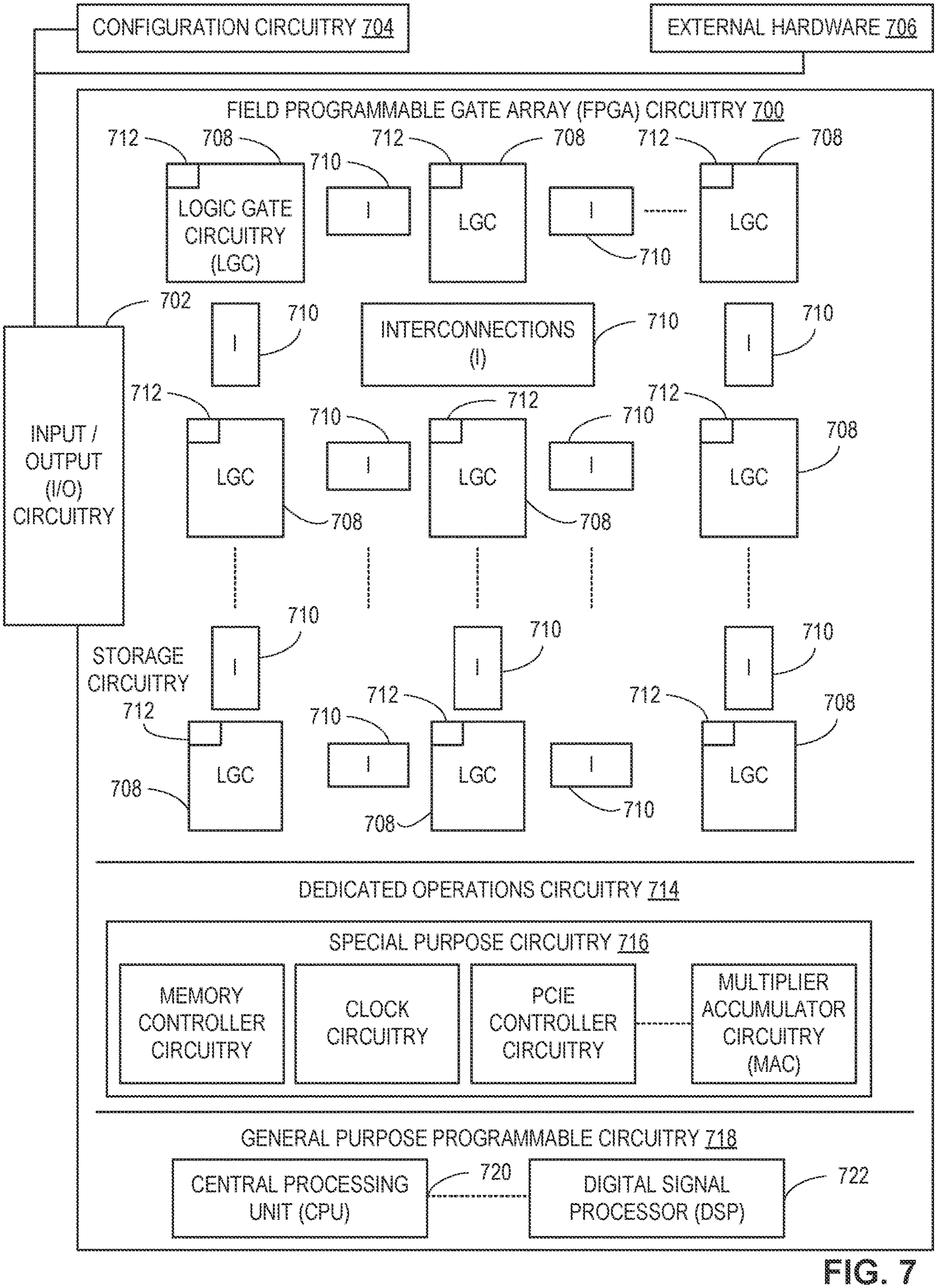
FIG. 7 is a block diagram of another example implementation of the processor circuitry of FIG. 5.

FIG. 7 is a block diagram of another example implementation of the processor circuitry 512 of FIG. 5. In this example, the processor circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 600 of FIG. 6 described above (which is a general purpose device that may be programmed to execute some or all of the machine readable instructions represented by the flowcharts of FIGS. 3 and 4 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowcharts of FIGS. 3 and 4. In particular, the FPGA circuitry 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some, or all of the software represented by the flowcharts of FIGS. 3 and 4. As such, the FPGA circuitry 700 may be structured to effectively instantiate some or all of the machine readable instructions of the flowcharts of FIGS. 3 and 4 as dedicated logic circuits to perform the operations corresponding to those software instructions in a dedicated manner analogous to an ASIC. Therefore, the FPGA circuitry 700 may perform the operations corresponding to the some or all of the machine readable instructions of FIGS. 3 and 4 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware 706. For example, the configuration circuitry 704 may be implemented by interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may be implemented by external hardware circuitry. For example, the external hardware 706 may be implemented by the microprocessor 600 of FIG. 6. The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations that may correspond to at least some of the machine readable instructions of FIGS. 3 and 4 and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an on-board CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowcharts of FIGS. 3 and 4 may be executed by one or more of the cores 602 of FIG. 6, a second portion of the machine readable instructions represented by the flowcharts of FIGS. 3 and 4 may be executed by the FPGA circuitry 700 of FIG. 7, and/or a third portion of the machine readable instructions represented by the flowcharts of FIGS. 3 and 4 may be executed by an ASIC. It should be understood that some or all of the circuitry of FIGS. 1 and/or 2 may, thus, be instantiated at the same or different times. Some or all of the circuitry may be instantiated, for example, in one or more threads executing concurrently and/or in series. Moreover, in some examples, some or all of the circuitry of FIGS. 1 and/or 2 may be implemented within one or more virtual machines and/or containers executing on the microprocessor.

In some examples, the processor circuitry 512 of FIG. 5 may be in one or more packages. For example, the microprocessor 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
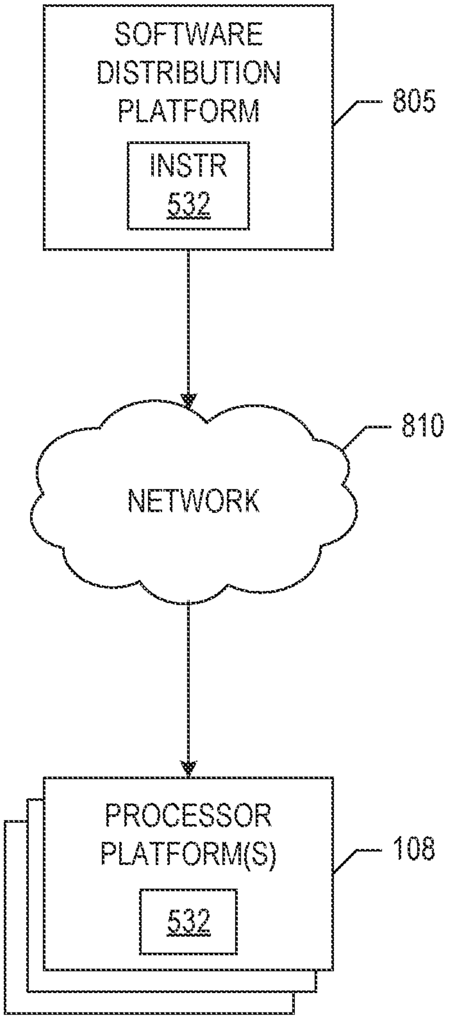
FIG. 8 is a block diagram of an example software distribution platform (e.g., one or more servers) to distribute software (e.g., software corresponding to the example machine readable instructions of FIGS. 3 and 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to hardware devices owned and/or operated by third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions 300 and 400 of FIGS. 3 and 4, as described above. The one or more servers of the example software distribution platform 805 are in communication with an example network 810, which may correspond to any one or more of the Internet and/or any of the example networks 526 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions 300 and 400 of FIGS. 3 and 4 may be downloaded to the example processor platform 500, which is to execute the machine readable instructions 532 to implement the processing unit allocation circuitry 104. In some examples, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

Figure 9:
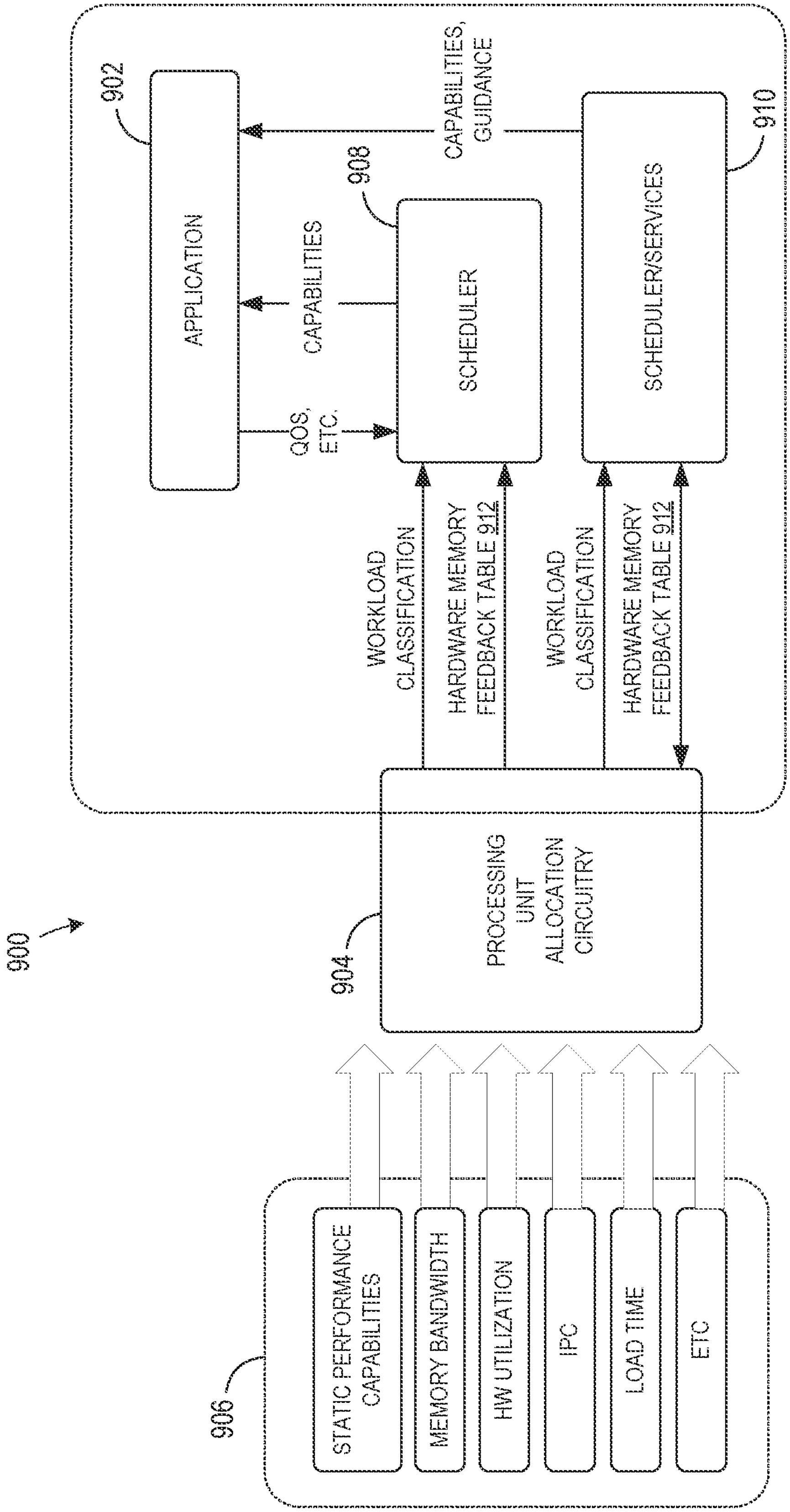
FIG. 9 is an example environment to allocate and schedule application workload on at least one processing unit.

FIG. 9 is an example environment 900 to allocate and schedule application workload on at least one processing unit. The example environment 900 includes a processing unit allocation circuitry 904 which can be leveraged by different scheduling frameworks. The example processing unit allocation circuitry 904 is one example of the processing unit allocation circuitry 104 described in FIGS. 1-4. The example processing unit allocation circuitry 904, in some examples, shares parameters 906 to an application 902 for optimal target device selection. In addition, the example environment 900 includes a scheduler 908. In some examples, the scheduler 908 is software. In other examples, the scheduler 908 is hardware based. The example environment 900 further includes a scheduler engine 910. In some examples, the scheduler engine 910 is software. In other examples, the scheduler engine 910 is hardware based. The example scheduler engine 910 receives information from the processing unit allocation circuitry 904 and share the processing unit capabilities with the example application 902. Furthermore, the example scheduler engine 910 decides which capabilities (e.g., performance, efficiency, power, latency, execution time, etc.) to schedule the application 902. In some examples, the application 902 is scheduled based on quality of service needs, and in other examples, the application is scheduled based on parameters 906. The example processing unit allocation circuitry 904 creates a hardware memory feedback table 912 to store the capabilities of processing units in classes defined by workload. The example hardware memory feedback table 912 is described in further detail below in FIG. 12.

Figure 10:
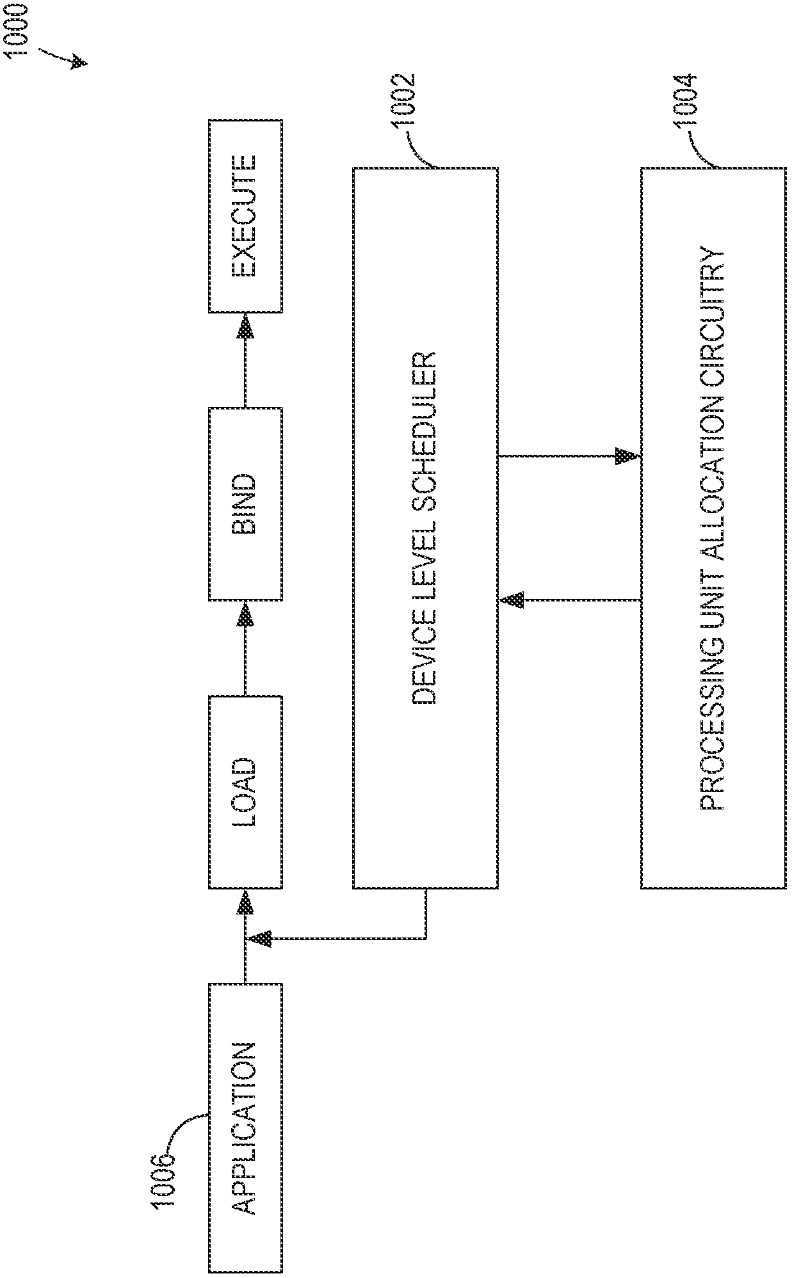
FIG. 10 is another example environment to allocate and schedule application workload on at least one processing unit.

FIG. 10 is another example environment 1000 to allocate and schedule application workloads on at least one processing unit. The example environment 1000 of FIG. 10 includes a device level scheduler 1002 that will allow for an application 1006 to submit workloads to an abstracted device (e.g., dev, processing unit in Linux, etc.) and the device level scheduler 1002 will use the feedback from a processing unit allocation circuitry 1004 to dynamically select the target processing unit device. The example processing unit allocation circuitry 1004 is one example of the processing unit allocation circuitry 104 described in FIGS. 1-4. The environment 1000 is an example of a dynamic scheduling based on hardware feedback.

For example, in example environment 1000, the application 1006 detects that system supports the processing unit allocation circuitry 1004. When selecting processing unit device, application will select the processing unit allocation circuitry 1004. By setting the processing unit allocation circuitry 1004, application opts into processing unit scheduler selecting a default class (described in more detail below) as a starting point. Based on the performance, energy efficiency, or goal of the application, the highest capability processing unit is selected in a default class. The processing unit allocation circuitry 1004 then receives the updated parameters 906, as described in FIG. 9. Based on the parameters 906 and other data (e.g., performance and quality of service data embedded in the application 1006), the processing unit allocation circuitry 1004 selects the appropriate processing unit to run the workload and submits the workload to a device driver. The corresponding driver can either interact directly with the abstracted processing unit security operations center or with the different processing unit hardware via the corresponding device drivers.

Additionally, other performance data can be leveraged to decide the goals of the application as performance and energy efficiency, respectively. For example, if a first application has requested high performance, a second application thread has requested minimum power, and, if the highest performing accelerator is the same for both the first and second application, then the first application receives preference on the accelerator to improve user experience. The same can be applied based on the priority and user interaction with the application. For example, a higher priority foreground thread would receive preference on the accelerator than the background lower priority thread.

FIG. 11 is an example memory table 1100. The example memory table 1102 includes rows labeled processing units which list available processing units 1106 on the example computing device 100 of FIG. 1 (e.g., integrated GPU (IGPU), discrete GPU (DGPU), VPU, CPU 0, CPU N, processing unit(x), etc.). The example memory table 1100 includes columns of classes 1104 that are workload classifications. In some examples, the workload classification include size and/or number of inferences. Additionally, the example memory table 1100 includes a timestamp 1106 which is a mark/indication of when the example memory table 1100 was last updated. The example memory table 1100 includes performance capability (Perf Cap) and efficiency capability (EE Cap) which represent the capabilities in a particular class for a particular processing unit. The example memory table 1100 schedules applications using static decision making for an application, for example, a decision on whether to go to CPU or GPU. However, the decision can be different for performance and/or efficiency preferences based on the number of CPU cores on the system, discreet or integrated GPU, and the processing unit's capabilities. Thus, the example memory table may be extended in include additional classes 4 and classes 5 for workloads that are better suited on VPU and GPU, respectively, as shown in FIG. 12.

FIG. 12 is an example of a hardware feedback memory table 1200. The example hardware feedback memory table 1200 includes rows labeled processing units which list available processing units 1206 on the example computing device 100 of FIG. 1 (e.g., integrated GPU (IGPU), discrete GPU (DGPU), VPU, CPU 0, CPU N, processing unit(x), etc.). The example hardware feedback memory table 1200 includes columns of classes 1210 that are workload classifications. In some examples, the workload classification include size and/or number of inferences. Additionally, the example hardware feedback memory table 1200 includes a timestamp 1208 which is a mark/indication of when the example hardware feedback memory table 1200 was last updated. The example hardware feedback memory table 1200 includes performance capability (Perf Cap) and efficiency capability (EE Cap) which represent the capabilities in a particular class for a particular processing unit. In some examples, additional columns are added per class to include other metrics to compare the processing unit capabilities such as power consumption. The example hardware feedback memory table 1200 includes the Perf Cap and EE Cap for CPU classes 1100, VPU classes 1202, and GPU classes 1204. However, the example hardware feedback memory table 1200 is not limited to these classes. For example, if the computing device 100 of FIG. 1 detected a new processing unit(x), those new processing unit(x) capabilities would be added to the example hardware feedback memory table 1200. Further, if the computing device 100 of FIG. 1 detected a processing unit (existing processing unit) was no longer available those class columns would be removed from the example hardware feedback memory table 1200.

This extension to current hardware feedback and schedulers leverages application priority/workload preference for scheduling decisions on various processing units. The processing unit allocation circuitry improves latency of inference workloads. Additionally, including VPU improves throughput. In some examples, the processing unit allocation circuitry improves user experience based on prioritizing accelerators to the high priority task. The processing unit allocation circuitry further allows for simplified application development as application developers will submit workloads to processing unit allocation circuitry and a scheduler will dynamically select the appropriate processing unit(s) and submit the workload accordingly.

The above example focuses on best accelerator selection for an application or thread. These examples can also be extended to optimize the various scheduling constructs like thread stealing, preemption, serialization versus idle accelerator selection based on performance versus energy efficiency trade off, and priority of work being executed. Furthermore, the examples above focus on the processing unit capabilities stored on a memory table. These examples can be extended to internal memory, external memory, registers of a processor, or a thread context block maintained by a scheduler.

From the foregoing, it will be appreciated that example systems, methods, apparatus, and articles of manufacture have been disclosed that allocate accelerator usage. Disclosed systems, methods, apparatus, and articles of manufacture improve the efficiency of using a computing device by allocating the workload of models, applications, and/or threads processing unit(s) based on efficiency, performance, user preference, power consumption, etc. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to allocate accelerator usage are disclosed herein. Further examples and combinations thereof include the following:

Example 1 includes an apparatus to allocate accelerator usage comprising interface circuitry to obtain instructions, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate application scheduler circuitry to store data identifying at least one processing unit in communication with the processing circuitry and at least one class, hardware predictor circuitry to predict a processing unit a workload is to be executed upon based on at least one capability, and scheduler engine circuitry to schedule which class of processing unit the workload will run on based on at least one of (i) hardware predictor circuitry or (ii) user priority parameters.

Example 2 includes the apparatus of example 1, wherein the at least one capability is based of at least one of performance, efficiency, power, latency, model size, execution time, or throughput.

Example 3 includes the apparatus of example 1, where in hardware feedback circuitry is to determine at least one performance capability of at least one of accelerator for at least one type of instruction or instruction mix in communication with the processing circuitry.

Example 4 includes the apparatus of example 1, wherein hardware feedback circuitry is to determine at least one efficiency capability of at least one of accelerator for at least one type of instruction or instruction mix in communication with the processing circuitry.

Example 5 includes the apparatus of example 1, wherein application engine circuitry is to store the data in at least one of a register, an external memory, an internal memory, a thread context block maintained by a scheduler, or a memory table.

Example 6 includes the apparatus of example 1, wherein application engine circuitry is to determine that the processing unit is available when the processing unit boots.

Example 7 includes the apparatus of example 1, wherein application engine circuitry is to detect when a new processing unit is available and add a new processing unit capability associated with the new processing unit to a hardware feedback memory table.

Example 8 includes the apparatus of example 1, wherein application engine circuitry is to detect when an existing processing unit is removed and to remove an existing processing unit capability associated with the removed processing unit from a hardware feedback memory table.

Example 9 includes an apparatus to allocate accelerator usage comprising at least one memory, machine readable instructions, and processor circuitry to at least one of instantiate or execute the machine readable instructions to store data identifying at least one processing unit in communication with a processing circuitry and at least one class, predict an execution of the at least one processing unit workload based on at least one capability, and schedule which processing unit the workload to run on based on at least one of (i) processor circuitry or (ii) user priority parameters.

Example 10 includes the apparatus of example 9, wherein at least one capability is based of at least one of performance, efficiency, power, latency, model size, execution time, or throughput.

Example 11 includes the apparatus of example 9, where in the processor circuitry is to determine at least one performance capability of at least one accelerator for at least one type of instruction or instruction mix in communication with the processing circuitry.

Example 12 includes the apparatus of example 9, wherein the processor circuitry is to determine at least one efficiency capability of at least one of accelerator for at least one type of instruction or instruction mix in communication with the processing circuitry.

Example 13 includes the apparatus of example 9, wherein application engine circuitry is to store the data in at least one of a register, an external memory, an internal memory, a thread context block maintained by a scheduler, or a memory table.

Example 14 includes the apparatus of example 9, wherein the processor circuitry is to determine that the processing unit is available when a processing unit is booted.

Example 15 includes the apparatus of example 9, wherein the processor circuitry is to detect when a new processing unit is available, and add a new processing unit capability associated with the new processing unit to a hardware feedback memory table.

Example 16 includes the apparatus of example 9, wherein the processor circuitry is to detect when an existing processing unit is removed and to remove an existing processing unit capability associated with the removed processing unit from a hardware feedback memory table.

Example 17 includes a non-transitory machine readable storage medium comprising instructions that, when executed, cause processor circuitry to at least generate data identifying at least one processing unit in communication with the processor circuitry and at least one class, predict an execution of the at least one processing unit workload based on at least one capability, and arrange which processing unit the workload will run on based on at least one of (i) hardware predictor circuitry or (ii) user priority parameters.

Example 18 includes the non-transitory machine readable storage medium of example 17, wherein at least one capability is based of at least one of performance, efficiency, power, latency, model size, execution time, or throughput.

Example 19 includes the non-transitory machine readable storage medium of example 17, wherein the instructions cause the processor circuitry to determine at least one performance capability of at least one accelerator in communication with the processing circuitry.

Example 20 includes the non-transitory machine readable storage medium of example 17, wherein the instruction cause the processor circuitry to determine at least one efficiency capability of at least one accelerator in communication with the processing circuitry.

Example 21 includes the non-transitory machine readable storage medium of example 17, wherein the instruction cause the processor circuitry to detect when a new processing unit is available, and add a new processing unit capability associated with the new processing unit to a hardware feedback memory table.

Example 22 includes the non-transitory machine readable storage medium of example 17, wherein the instruction cause the processor circuitry to detect when an existing processing unit is removed, and to remove an existing processing unit capability associated with the removed processing unit from a hardware feedback memory table.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to allocate processing unit usage comprising:

interface circuitry to receive instructions or data from a remote computing device via a communication network;

memory; and at least one processor circuit adaptable to execute the instructions or process the data to, when using the memory:

store data identifying at least one processing unit in communication with the at least one processor circuit and at least one class;

predict a processing unit on which a workload is to be executed based on at least one capability from a hardware feedback memory table; and schedule which class of processing unit the workload is to be run on based on at least one of (i) the predicted processing unit or (ii) user priority parameters;

add a new processing unit capability associated with a new processing unit to the hardware feedback memory table after detection of availability of the new processing unit; and remove an existing processing unit capability associated with an existing processing unit from the hardware feedback memory table after detection of removal of the existing processing unit.

2. The apparatus of claim 1, wherein the at least one capability is based on at least one of performance, efficiency, power, latency, model size, execution time, or throughput.

3. The apparatus of claim 1, wherein one or more of the at least one processor circuit is to determine at least one performance capability of at least one accelerator for at least one type of instruction or instruction mix in communication with the at least one processor circuit.

4. The apparatus of claim 1, wherein one or more of the at least one processor circuit is to determine at least one efficiency capability of at least one accelerator for at least one type of instruction or instruction mix in communication with the at least one processor circuit.

5. The apparatus of claim 1, wherein one or more of the at least one processor circuit is to store the data identifying at least one processing unit and at least one class in at least one of a register, an external memory, an internal memory, a thread context block maintained by a scheduler, or a memory table.

6. The apparatus of claim 1, wherein one or more of the at least one processor circuit is to determine that the processing unit is available when the processing unit boots.

7. An apparatus to allocate accelerator usage comprising:

at least one memory;

machine readable instructions; and processor circuitry to at least one of instantiate or execute the machine readable instructions to:

store data identifying at least one processing unit in communication with a processing circuitry and at least one class;

predict a processing unit on which a workload is to be executed based on at least one capability from a hardware feedback memory table;

schedule which processing unit the workload is to be run on based on at least one of (i) the predicted processing unit or (ii) user priority parameters;

add a new processing unit capability associated with a new processing unit to the hardware feedback memory table after detection of availability of the new processing unit; and remove an existing processing unit capability associated with an existing processing unit from the hardware feedback memory table after detection of removal of the existing processing unit.

8. The apparatus of claim 7, wherein at least one capability is based on at least one of performance, efficiency, power, latency, model size, execution time, or throughput.

9. The apparatus of claim 7, where in the processor circuitry is to determine at least one performance capability of at least one accelerator for at least one type of instruction or instruction mix in communication with the processing circuitry.

10. The apparatus of claim 7, wherein the processor circuitry is to determine at least one efficiency capability of at least one of accelerator for at least one type of instruction or instruction mix in communication with the processing circuitry.

11. The apparatus of claim 7, wherein the processor circuitry is to store the data in at least one of a register, an external memory, an internal memory, a thread context block maintained by a scheduler, or a memory table.

12. The apparatus of claim 7, wherein the processor circuitry is to determine that the processing unit is available when a processing unit is booted.

13. A non-transitory machine readable storage medium comprising instructions that, when executed, cause processor circuitry to at least:

generate data identifying at least one processing unit in communication with the processor circuitry and at least one class;

predict a processing unit on which a workload is to be executed based on at least one capability from a hardware feedback memory table;

arrange which processing unit the workload will run on based on at least one of (i) the predicted processing unit or (ii) user priority parameters;

add a new processing unit capability associated with a new processing unit to the hardware feedback memory table after detection of availability of the new processing unit; and remove an existing processing unit capability associated with an existing processing unit from the hardware feedback memory table after detection of removal of the existing processing unit.

14. The non-transitory machine readable storage medium of claim 13, wherein at least one capability is based on at least one of performance, efficiency, power, latency, model size, execution time, or throughput.

15. The non-transitory machine readable storage medium of claim 13, wherein the instructions cause the processor circuitry to determine at least one performance capability of at least one accelerator in communication with the processing circuitry.

16. The non-transitory machine readable storage medium of claim 13, wherein the instructions cause the processor circuitry to determine at least one efficiency capability of at least one accelerator in communication with the processing circuitry.

17. The apparatus of claim 1, wherein the at least one processor circuit is further to determine a highest-capability processing unit among the at least one processing unit in communication with the processor circuit.

18. The apparatus of claim 17, wherein the at least one processor circuit is further to populate the hardware feedback memory table with capabilities of other processing units relative to the highest-capability processing unit.

19. The apparatus of claim 18, wherein the at least one processor circuit is further to add a class to the hardware feedback memory table when a combination of parameters results in a processing unit other than the highest-capability processing unit becoming the highest-capability processing unit.

20. The apparatus of claim 19, wherein the combination of parameters includes at least one of model size, inference time, or bind time.

21. The apparatus of claim 19, wherein the at least one processor circuit is further to repeat identification of parameter combinations until a threshold number of classes is stored in the hardware feedback memory table.

22. The apparatus of claim 1, wherein the hardware feedback memory table organizes capability data by workload class, wherein each workload class corresponds to at least one of a workload size or a number of inferences.

* * * * *